(12) United States Patent
Roy et al.

(10) Patent No.: US 8,336,957 B2
(45) Date of Patent: Dec. 25, 2012

(54) TRAY TABLE

(75) Inventors: Philippe Roy, Bourges (FR); Jeffrey P. Wegenka, Denton, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 167 days.

(21) Appl. No.: 12/989,086

(22) PCT Filed: Sep. 29, 2010

(86) PCT No.: PCT/US2010/050619
§ 371 (c)(1),
(2), (4) Date: Oct. 22, 2010

(87) PCT Pub. No.: WO2011/041343
PCT Pub. Date: Jul. 4, 2011

(65) Prior Publication Data
US 2011/0204683 A1     Aug. 25, 2011

Related U.S. Application Data

(60) Provisional application No. 61/277,731, filed on Sep. 29, 2009.

(51) Int. Cl.
*A47B 83/02* (2006.01)
(52) U.S. Cl. .................... 297/163; 297/165; 297/167
(58) Field of Classification Search ............ 297/163, 297/165, 167
See application file for complete search history.

(56) References Cited

U.S. PATENT DOCUMENTS

| | | | |
|---|---|---|---|
| 3,009,737 A | | 11/1961 | Burnett |
| 4,281,874 A | * | 8/1981 | Iwans et al. .................. 297/163 |
| 4,364,604 A | * | 12/1982 | Brunelle ....................... 297/163 |
| 4,431,231 A | * | 2/1984 | Elazari et al. ................ 297/163 |
| 4,511,178 A | * | 4/1985 | Brennan .................. 297/163 X |
| 5,176,423 A | * | 1/1993 | Austin et al. ............. 297/163 X |
| 7,784,862 B2 | * | 8/2010 | Pozzi et al. .................. 297/167 |
| 2011/0156452 A1 | * | 6/2011 | Schumm et al. ............. 297/163 |

FOREIGN PATENT DOCUMENTS

| | | |
|---|---|---|
| EP | 0112170 | 6/1984 |
| JP | 2006341752 | 12/2006 |

OTHER PUBLICATIONS

International Search Report and Written Opinion dated May 31, 2011 in Application No. PCT/US2010/050619.
International Preliminary Report on Patentability dated Apr. 12, 2012 in Application No. PCT/US2010/050619.

* cited by examiner

*Primary Examiner* — Rodney B White
(74) *Attorney, Agent, or Firm* — Dean W. Russell; Tiffany L. Williams; Kilpatrick Townsend & Stockton LLP

(57) ABSTRACT

A tray table assembly comprises a table body, at least one arm, and at least one table stop. The at least one arm is pivotally coupled to the table body. The at least one arm is also pivotally coupled to a pivot shaft interior to at least one location where a passenger seat back is pivotally coupled to the pivot shaft. The at least one table stop is fixedly coupled to the pivot shaft adjacent the location where the at least one arm is pivotally coupled to the pivot shaft. The tray table assembly may be coupled to a passenger seat back comprising a recess and may be configured to substantially fit within the recess.

13 Claims, 6 Drawing Sheets

TRAY TABLE

CROSS REFERENCE TO RELATED APPLICATIONS

This application is the U.S. national phase of International Application No. PCT/US2010/51690 filed on Sept. 29, 2010 and is related to and claims priority benefits from U.S. Provisional Application Ser. No. 61/277,731, filed on Sep. 29, 2009, entitled SLIM TABLE MECHANISM THAT STOWS INSIDE AN AIRCRAFT RECLINING SEATBACK. The '731 and '690 applications are hereby incorporated in their entireties by this reference.

FIELD OF THE INVENTION

The field of the invention relates to tray tables for passenger seats or the like.

BACKGROUND

Many passenger seats such as those on passenger aircraft, buses, trains, and the like are arranged so that each passenger seat, other than the forward-most located passenger seats, faces the back of the next forward passenger seat. To increase a passenger's comfort, many passenger seat backs rotate between upright and reclined positions.

In some instances, a tray table may be mounted adjacent the back of each passenger seat for use by a passenger in the next aft passenger seat. The tray table is deployed by the passenger to provide a relatively flat surface for eating, working, recreation, or other uses.

Because the next forward passenger seat back may recline while the tray table is in use, tray tables are typically mounted to a pivot shaft outside the contour of the passenger seat back so that use of the tray table is not disturbed by the reclining motion of the passenger seat back. By coupling the tray table to the pivot shaft outside the passenger seat back, as shown in FIG. 8, the conventional location of the tray table encroaches on the space available to the passenger when the tray table is stowed.

In certain situations, it may be desirable to reduce the space occupied by the tray table when the tray table is stowed, while still providing a coupling location that allows the passenger seat back to recline without disturbing the use of the tray table.

SUMMARY

Embodiments of the present invention include a tray table assembly comprising a table body, at least one arm, and at least one table stop. The table body includes at least one shaft. The at least one arm comprises a first end and a second end. The first end is pivotally coupled to the at least one shaft. In some embodiments, the table body may include at least one rotation limiting pin and the at least one arm may include a rotation limiting pin receiver, wherein a side of the rotation limiting pin receiver is configured to contact the at least one rotation limiting pin when the table body is positioned at a released table body angle. The second end of the at least one arm is configured to pivotally couple to a pivot shaft in a location interior to at least one location where a passenger seat back is pivotally coupled to the pivot shaft.

The at least one table stop is configured to couple to the at least one arm. The at least one table stop may include a stop pin and the at least one arm may include a stop pin receiver, wherein a side of the stop pin receiver is configured to contact the stop pin when the at least one arm is positioned at a released arm angle. An end of the at least one table stop is configured to fixedly couple to the pivot shaft in a location adjacent the location where the second end of the at least one arm is configured to pivotally couple to the pivot shaft. In some embodiments, the pivot shaft is coupled to a fixed structure and transfers a turning force from the at least one table stop to the fixed structure.

In some embodiments, the tray table assembly is coupled to a passenger seat back comprising a recess. The tray table assembly may be configured to substantially fit within the recess. In some embodiments, the table body has a thickness that is not greater than approximately one-half inch. The passenger seat back may be configured to pivot relative to the pivot shaft while the tray table assembly remains stationary at a released table body angle and a released arm angle. The table body may be oriented approximately 90 degrees from a vertical axis when the table body is positioned at the released table body angle and the at least one arm is positioned at the released arm angle.

DETAILED DESCRIPTION

Embodiments of the invention provide tray table assemblies for use with a passenger seat. While the tray table assemblies are discussed for use with aircraft seats, they are by no means so limited. Rather, embodiments of the tray table assemblies may be used in passenger seats or other seats of any type or otherwise as desired.

FIGS. 1-7 and 9-10 illustrate one embodiment of a tray table assembly 10. The tray table assembly 10 comprises a table body 12, at least one arm 14, and at least one table stop 16.

The internal structure of the table body 12 may be formed of materials including but not limited to aluminum, stainless steel, aramid fibers, polycarbonate, polypropylene, other metallic materials, composite materials, or other similar materials. In some embodiments, the internal structure of the table body 12 has a honeycomb structure, where the honeycomb structure comprises an arrangement of hollow tubes that are coupled to one another along the length of the hollow tubes. The hollow tubes may have a cylindrical, hexagonal, or other similar cross-sectional shape. Use of the honeycomb internal structure provides the necessary structural integrity for the table body 12 while minimizing the weight of the table body 12.

Figure 1:
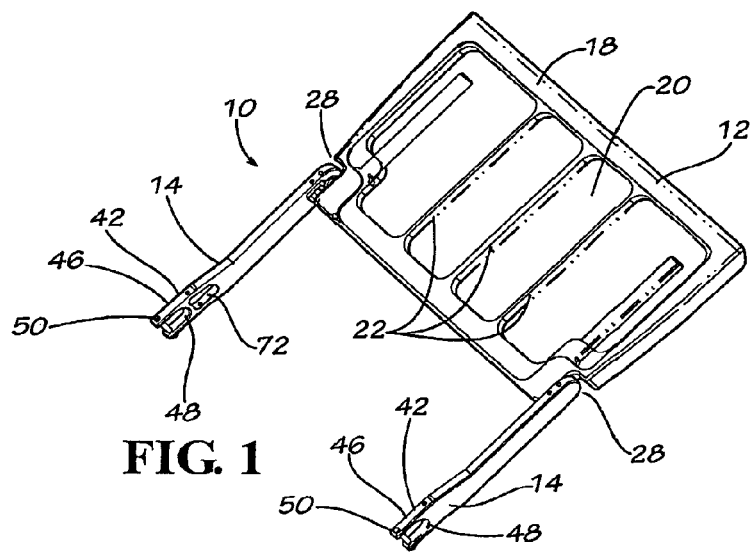
FIG. 1 is a perspective view of a tray table assembly according to one embodiment of the present invention.
Figure 2:
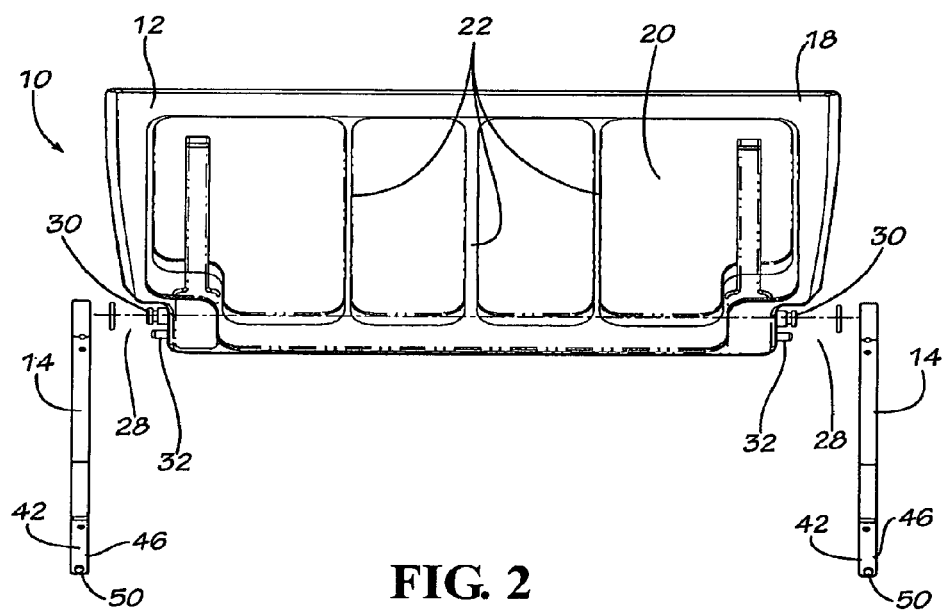
FIG. 2 is an exploded perspective view of the tray table assembly of FIG. 1.
Figure 3:
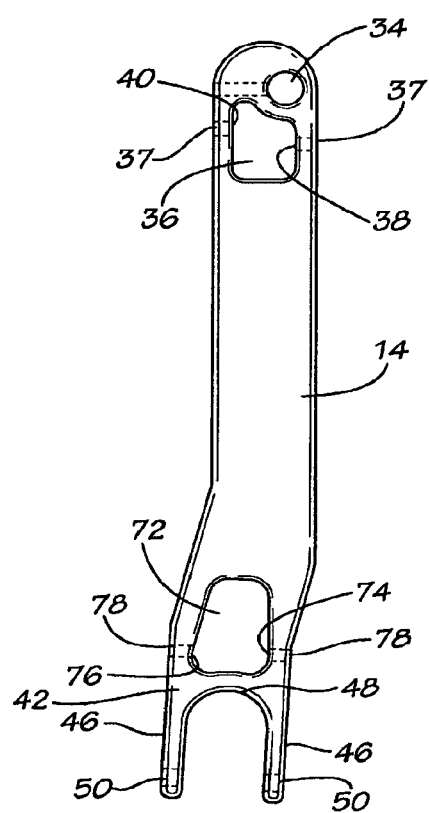
FIG. 3 is a side view of an arm of the tray table assembly of FIG. 1.
Figure 4:
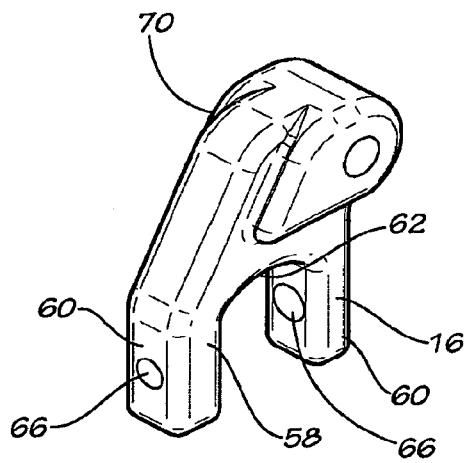
FIG. 4 is a perspective view of a table stop of the tray table assembly of FIG. 1.

In other embodiments, such as the embodiment illustrated in FIGS. 1-2, the internal structure of the table body 12 comprises a frame 18 that forms the outline of the table body 12 around a central opening 20. The frame 18 with the central opening 20 also provides the necessary structural integrity of the table body 12 while minimizing the weight of the table body 12. In this embodiment, the internal structure of the table body 12 may include at least one bar 22 that spans the central opening 20 to provide additional structural integrity to the table body 12. The number of bars 22 that are used is dependent on, among other factors, the size of the table body 12, the type of material used to form the frame 18, and the amount of structural integrity required for the table body 12.

The internal structure of the table body 12 may be enclosed by a cover 24. In some embodiments, the internal structure of the table body 12 and the cover 24 may be integrally formed. The cover 24 may be formed of materials including but not limited to polycarbonate, polypropylene, other plastic materials, metallic materials, composite materials, or other similar materials. One of skill in the art will understand that any suitable cover and internal structure may be used to form the table body 12 that will provide a lightweight, slim table body 12 having sufficient strength to withstand forces that may be placed on the tray table assembly 10.

Figures 5, 6:
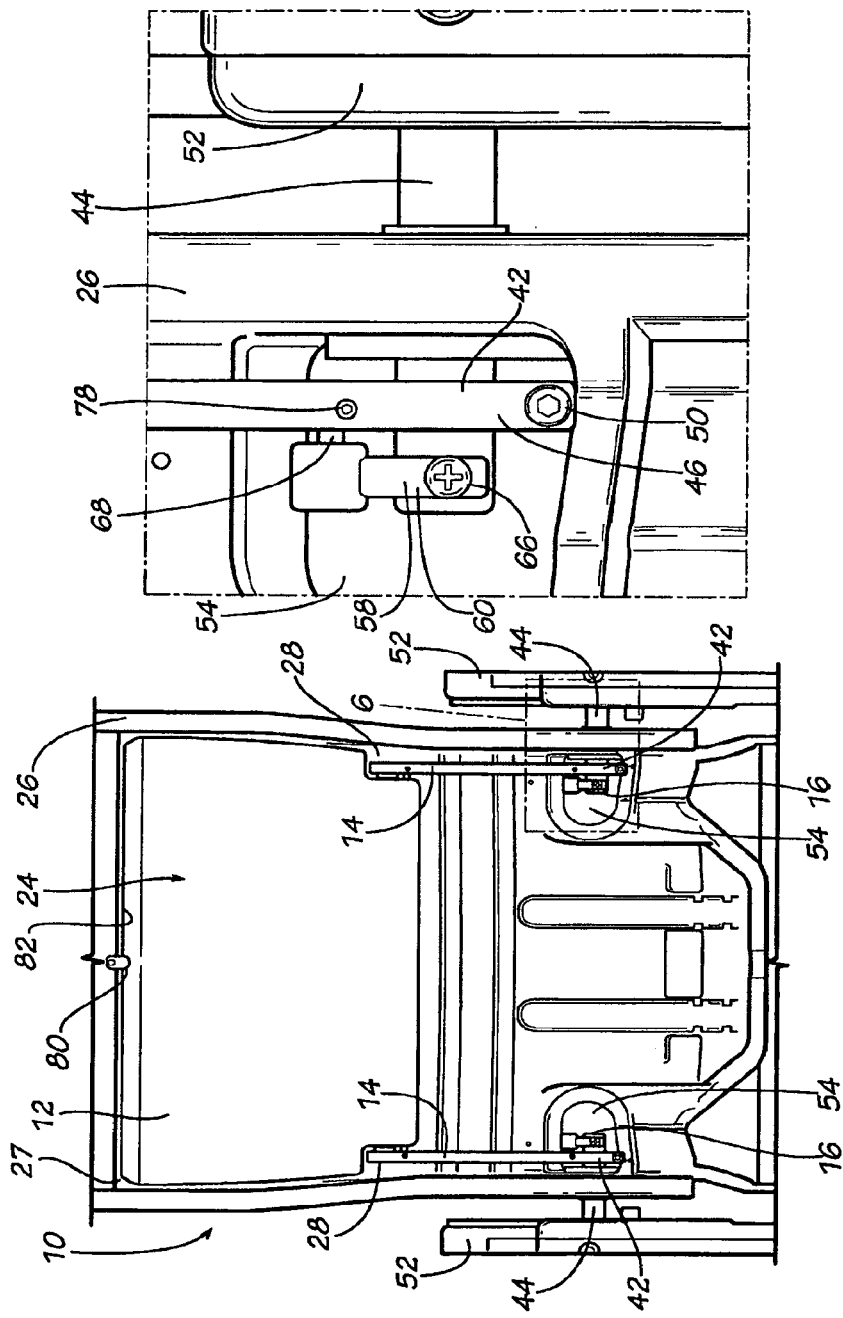
FIG. 5 is a front view of the tray table assembly of FIG. 1 coupled to a passenger seat.
FIG. 6 is an expanded front view of a portion of the tray table assembly of FIG. 1 coupled to a passenger seat.
Figures 8, 9:
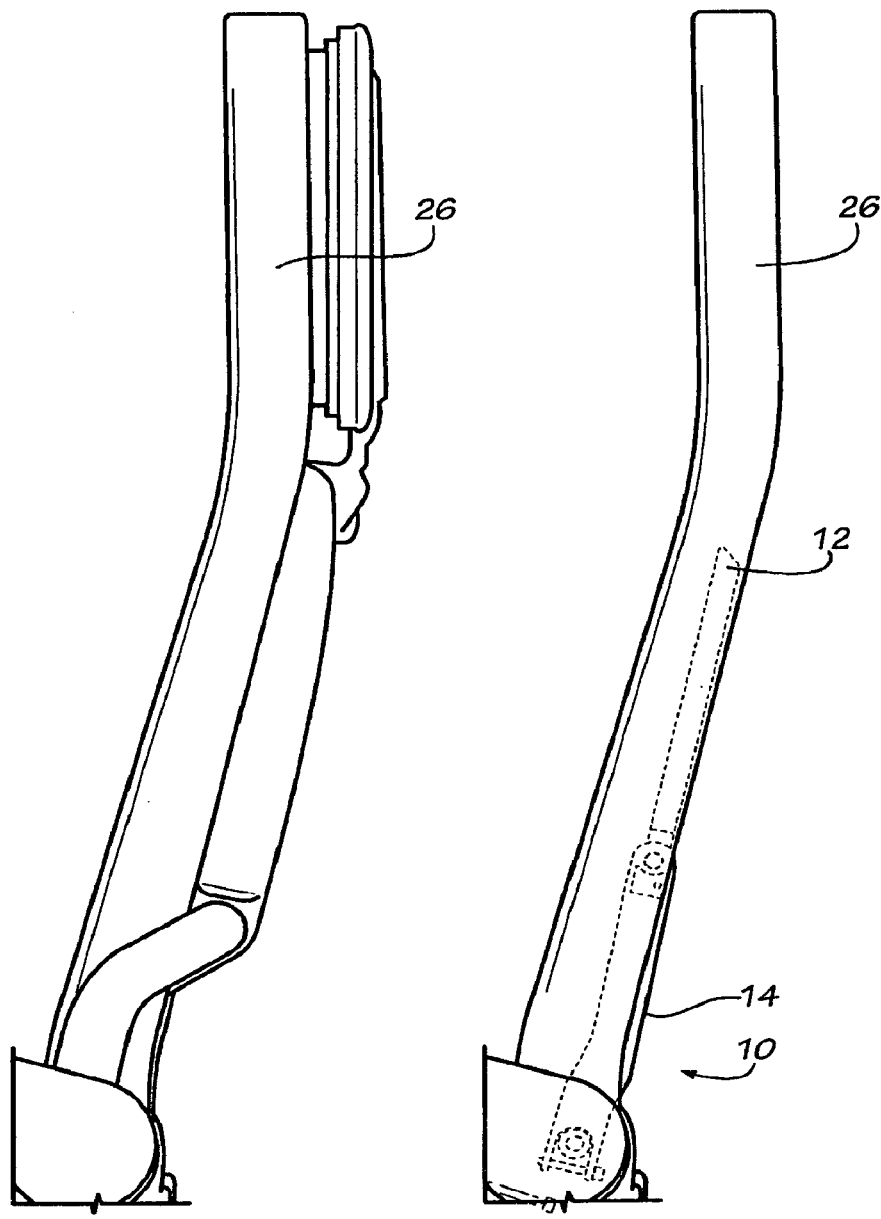
FIG. 8 is a side view of a conventional tray table assembly coupled to a passenger seat.
FIG. 9 is a side view of the tray table assembly of FIG. 1 coupled to a passenger seat.

In some embodiments, the table body 12 is configured to stow within a recess 27 formed in a passenger seat back 26. In these embodiments, as best illustrated in FIGS. 5 and 9, the recess 27 that may have any suitable shape including but not limited to rectilinear, trapezoidal, parabolic, or other suitable shape that does not exceed the outer perimeter of the passenger seat back 26. In some embodiments, the table body 12 is shaped to substantially conform to the shape of the recess 27. In other embodiments, the table body 12 may have a shape that differs from the shape of the recess 27, while still fitting within the shape of the recess 27. For example, the recess 27 may have a rectilinear shape, while the table body 12 may have a trapezoidal shape that fits within the rectilinear shape of the recess 27. As a result, the table body 12 may have any suitable shape including but not limited to rectilinear, trapezoidal, parabolic, or other suitable shape that fits within the shape of the recess 27.

Likewise, because the table body is configured to stow within the passenger seat back 26 to minimize the space occupied by the tray table assembly 10 when stowed, the table body 12 may have any suitable thickness that approximates the depth of the recess 27. For example, in embodiments such as the embodiment illustrated in FIG. 9, the thickness of the table body 12 may be any appropriate thickness that will allow the table body 12 to stow flush with an outer edge of the recess 27. In this embodiment, the thickness of the table body 12 is less than one inch, and preferably not greater than one-half inch. In other embodiments, it may be sufficient to partially stow the table body 12 within the recess 27, such that a portion of the table body 12 is partially surrounded by the recess 27, while another portion of the table body 12 extends into the space outside the recess 27.

The recess 27 may have any suitable depth that does not exceed the thickness of the passenger seat back 26. In some embodiments, the depth of the recess 27 may have approximately the same dimension as the thickness of the passenger seat back 26. In other embodiments, the depth of the recess 27 may be less than the thickness of the passenger seat back 26. The appropriate size of the recess 27 and the thickness of the table body 12 for the various embodiments is dependent on, among other factors, the amount of cushioning desired for the passenger seat back 26, the amount of space desired for the passenger, the size and material of the table body 12, and the amount of structural integrity required for the table body 12.

One end of the table body 12 may optionally include at least one notch 28. The at least one notch 28 is configured to provide a space for the table body 12 to pivotally couple to the at least one arm 14. Within the at least one notch 28, the table body 12 includes at least one shaft 30. In some embodiments, the at least one shaft 30 is a single shaft that extends the entire width of the table body 12 and forms a lower portion of the frame 18. In other embodiments, the at least one shaft 30 is a projection coupled to the frame 18 adjacent the at least one notch 28.

In some embodiments, such as the embodiment illustrated in FIGS. 1, 2, and 5, the table body 12 is coupled to a pair of arms 14 located at each side of the table body 12. In other embodiments, the table body 12 may be coupled to a single arm 14 located in the center or to one side of the table body 12. In yet other embodiments, the table body 12 may be coupled to three or more arms 14.

The at least one arm 14 may be formed of materials including but not limited to aluminum, stainless steel, polycarbonate, polypropylene, other metallic materials, composite materials, or other similar materials. In some embodiments, the at least one arm 14 has a substantially rectilinear shape. In other embodiments, the at least one arm 14 is curved. In yet other embodiments, such as the embodiment illustrated in FIG. 3, the at least one arm 14 has two substantially straight sections connected by an angled section. One of skill in the relevant art will understand that any suitable materials and shapes may be used to form the at least one arm 14 that provide sufficient strength to withstand forces that may be placed on the tray table assembly 10.

The at least one arm 14 includes a receptacle 34 that pivotally couples to the at least one shaft 30. In some embodiments, a washer may be placed around the at least one shaft 30 prior to coupling the at least one shaft 30 to the receptacle 34. To secure the at least one shaft 30 to the receptacle 34, a set screw may be used that passes through a side of the at least one arm 14 and is secured adjacent a side of the at least one shaft 30. In other embodiments, a screw, bolt, rivet, or other suitable mechanical fastening device may be used that may pass through the receptacle 34 and couple to an end of the at least one shaft 30. One of skill in the relevant art will understand that any suitable means may be used to secure the at least one arm 14 to the table body 12.

The rotation of the table body 12 relative to the at least one arm 14 is halted by a mechanical stop. In some embodiments, the mechanical stop may comprise a pin finger attached to the at least one shaft 30 that halts the rotation of the table body 12 when the pin finger contacts a fixed stop on the at least one arm 14. In other embodiments, the mechanical stop may comprise a pin finger attached to both the at least one shaft 30 and the at least one arm 14, where both pin fingers are configured to halt the rotation of the table body 12 when the two finger pins contact one another. In yet other embodiments, such as the embodiment illustrated in FIGS. 2, 3, and 10, the table body 12 includes at least one rotation limiting pin 32 that is positioned adjacent the at least one shaft 30. The at least one arm 14 includes a rotation limiting pin receiver 36 that is shaped to receive the at least one rotation limiting pin 32. The rotation limiting pin receiver 36 is configured to halt the rotation of the table body 12 when a side of the rotation limiting pin receiver 36 contacts the at least one rotation limiting pin 32.

Figure 10:
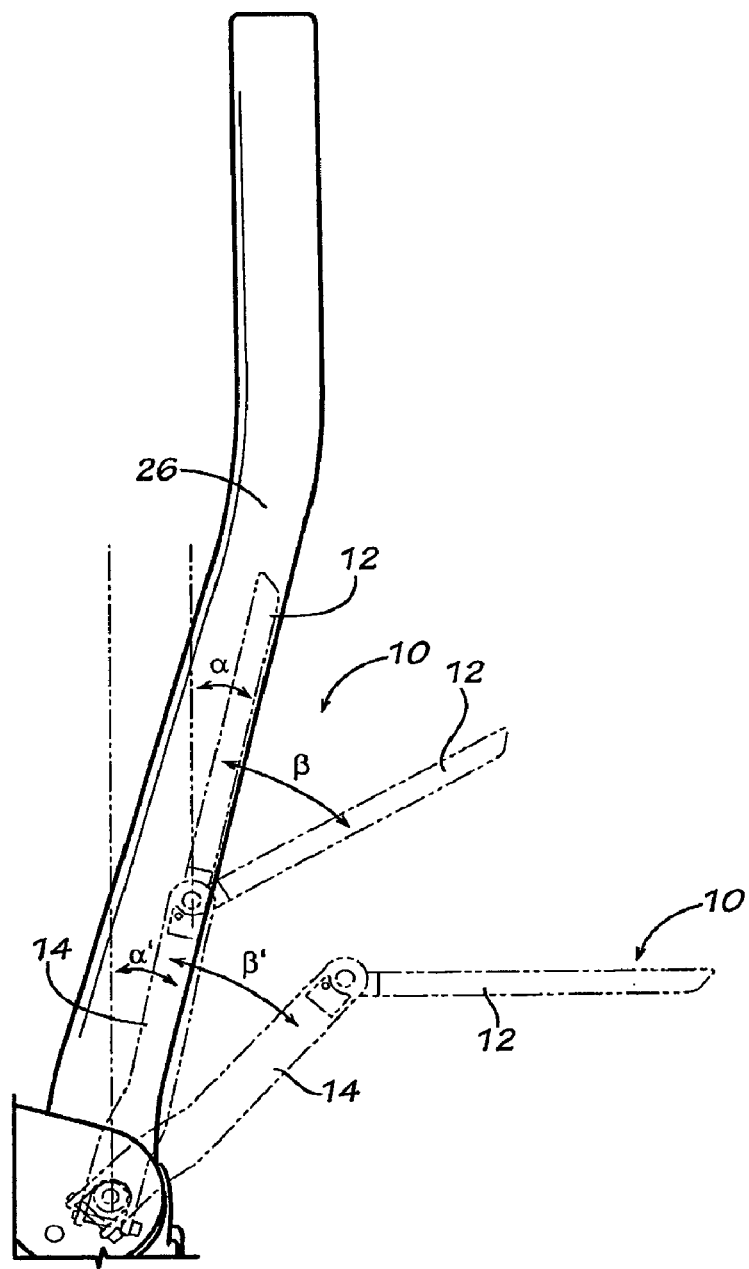
FIG. 10 is a side view showing the stowed and released positions of the tray table assembly of FIG. 1 coupled to a passenger seat.

In some embodiments, the rotation limiting pin receiver 36 allows the table body 12 to rotate from a stowed table body angle α to a released table body angle β. The stowed table body angle α may be defined as any appropriate angle formed between the table body 12 and a vertical axis, as illustrated in FIG. 10. In some embodiments, the stowed table body angle α is approximately 15 degrees when the passenger seat back 26 is in an upright orientation and is approximately 30 degrees when the passenger seat back 26 is in a fully reclined orientation. However, one of skill in the relevant art will understand that the stowed table body angle α may be any appropriate angle that approximately corresponds to the position of the passenger seat back 26. When the table body 12 is positioned at the stowed table body angle α, an outer side 38 of the rotation limiting pin receiver 36 may contact the at least one rotation limiting pin 32. In some embodiments, a set screw 37 may be used to adjust the stowed table body angle α.

The released table body angle β may be defined as any appropriate angle formed between the table body 12 and the stowed table body angle α, as illustrated in FIG. 10. The released table body angle β may range from 15 degrees to 75 degrees from the stowed table body angle α, and may preferably be approximately 45 degrees from the stowed table body angle α. When the table body 12 is positioned at the released table body angle β, an inner side 40 of the rotation limiting pin receiver 36 may contact the at least one rotation limiting pin 32. In some embodiments, another set screw 37 may be used to adjust the released table body angle β.

Figure 7:
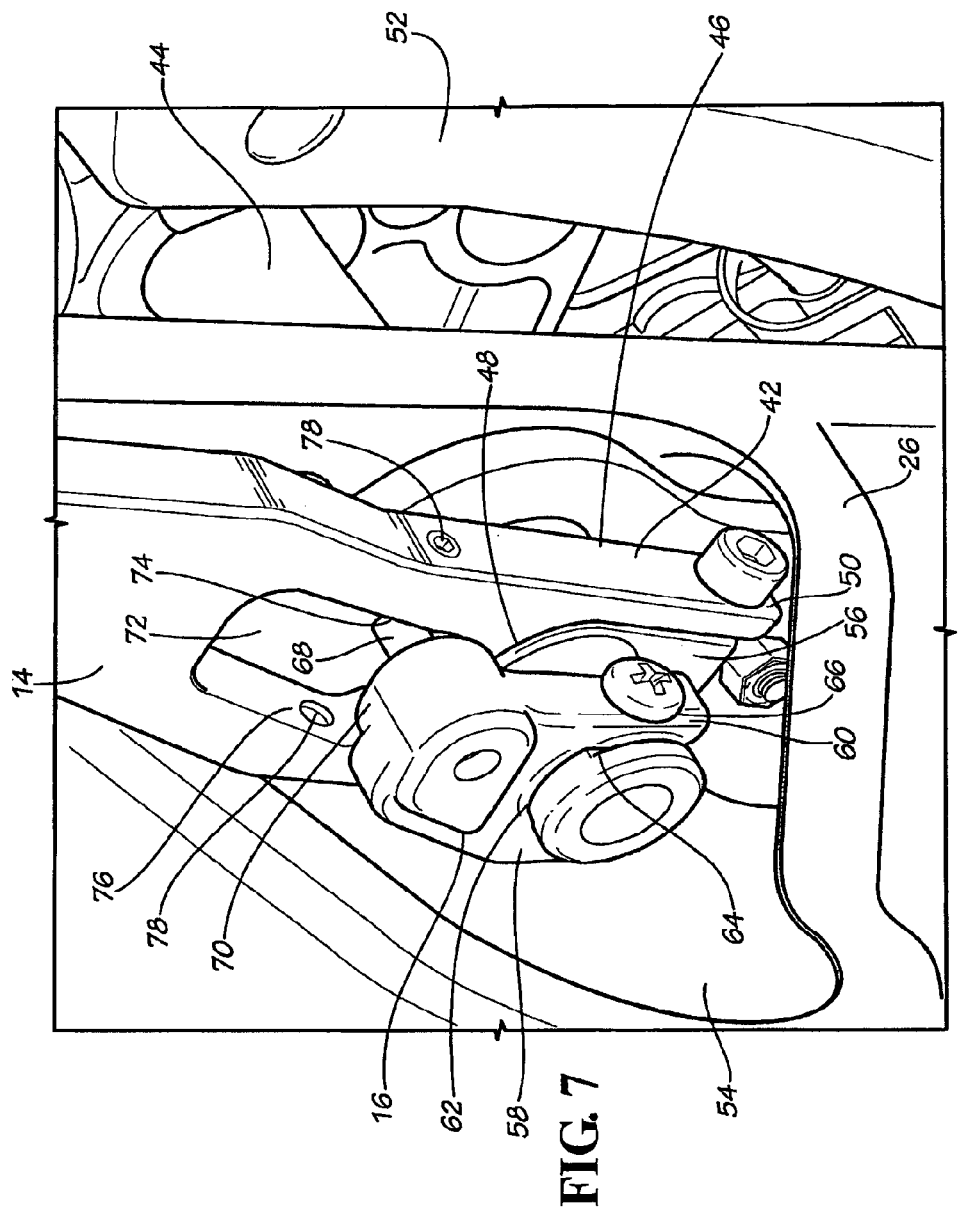
FIG. 7 is a perspective view of a portion of the tray table assembly of FIG. 1 coupled to a passenger seat.

The at least one arm 14 also includes a clamp 42 configured to pivotally couple the at least one arm 14 to a pivot shaft 44 located at the lower end of the passenger seat back 26. The pivot shaft 44 is affixed to a fixed structure 52 that connects the passenger seat back 26 to a vehicle. The pivot shaft 44 may be formed of materials including but not limited to aluminum, stainless steel, other metallic materials, composite materials, or other similar materials. The pivot shaft 44 is designed to withstand application of a substantial torque force without separating from the fixed structure 52. As shown in FIGS. 5-7, the pivot shafts 44 extends inwardly from the fixed structure 52 located on each side of the passenger seat back 26 to serve as a coupling location for the passenger seat back 26.

In some embodiments, such as the embodiment illustrated in FIGS. 5-7, each pivot shaft 44 extends at least partially through the passenger seat back 26 into an opening 54 formed within the passenger seat back 26. The opening 54 provides a location for the at least one arm 14 to pivotally couple to the pivot shaft 44 in a location interior to at least one location where the passenger seat back 26 is pivotally coupled to the pivot shaft 44. The opening 54 therefore provides clearance for the passenger seat back 26 to pivot relative to the pivot shaft 44 while the tray table assembly 10 remains stationary at the released angles β and β'.

In some embodiments, such as the embodiment illustrated in FIGS. 1-3 and 5-7, the clamp 42 has a substantially U-shaped configuration formed by a pair of legs 46 and a base 48. The pair of legs 46 are configured to tangentially contact portions of the rounded surface of the pivot shaft 44, and the base 48 is shaped to substantially conform to a portion of the rounded surface the pivot shaft 44. The clamp 42 includes an aperture 50 in each leg 46, through which a screw, bolt, rivet, or other suitable mechanical fastening device is inserted to pivotally couple the clamp 42 to the pivot shaft 44. In some embodiments, a bearing 56 may be included between the clamp 42 and the pivot shaft 44, where the bearing 56 may provide a tighter fit between the pivot shaft 44 and the clamp 42 to reduce rattle noise between the components and improve rotation. One of skill in the relevant art will understand that any suitable coupling arrangement may be used between the at least one arm 14 and the pivot shaft 44 that securely couples the at least one arm 14 to the pivot shaft 44 in a manner that allows the at least one arm 14 to rotate relative to the pivot shaft 44.

In some embodiments, the at least one table stop 16 is fixedly coupled to the pivot shaft 44 adjacent the at least one arm 14. In some embodiments, such as the embodiment illustrated in FIGS. 5-7, the at least one table stop 16 may be fixedly coupled to the pivot shaft 44 in a location interior to the location where the at least one arm 14 is pivotally coupled to the pivot shaft 44. In other embodiments, the at least one table stop 16 may be fixedly coupled to the pivot shaft 44 in a location between the location where the at least one arm 14 is pivotally coupled to the pivot shaft 44 and at least one location where the passenger seat back 26 is pivotally coupled to the pivot shaft 44. One of skill in the relevant art will understand that any suitable location may be used to fixedly couple the at least one table stop 16 to the pivot shaft 44 so long as the at least one table stop 16 is adjacent the at least one arm 14.

The at least one table stop 16 may be formed of materials including but not limited to aluminum, stainless steel, other metallic materials, composite materials, or other similar materials. For example, in the embodiment shown in FIGS. 5-7, the at least one table stop 16 is coupled to a notched section 64 of the pivot shaft 44. The at least one table stop 16 includes a clamp 58 fixedly coupled at one end to the notched section 64. In the embodiment best illustrated in FIG. 4, the clamp 58 has a substantially U-shaped configuration formed by a pair of legs 60 and a base 62. The pair of legs 60 are configured to extend along the notched section 64 of the pivot shaft 44, and the base 62 is shaped to substantially conform to a portion of the rounded surface of the pivot shaft 44. The clamp 58 also includes an aperture 66 in each leg 60, through which a screw, bolt, rivet, or other suitable mechanical fastening device is inserted to fixedly couple the clamp 58 to the pivot shaft 44. One of skill in the relevant art will understand that any suitable coupling arrangement may be used between the at least one table stop 16 and the pivot shaft 44 that securely couples the at least one table stop 16 to the pivot shaft 44 in a manner that prevents the at least one table stop 16 from rotating relative to the pivot shaft 44.

The rotation of the at least one arm 14 relative to the pivot shaft 44 is halted by a mechanical stop. In some embodiments, the mechanical stop may comprise a pin finger attached to the at least one arm 14 that halts the rotation of the at least one arm 14 when the pin finger contacts a fixed stop on the pivot shaft 44. In other embodiments, the mechanical stop may comprise a pin finger attached to both the pivot shaft 44 and the at least one arm 14, where both pin fingers are configured to halt the rotation of the at least one arm 14 when the two finger pins contact one another. In yet other embodiments, such as the embodiment illustrated in FIGS. 5-7, the at least one table stop 16 includes a stop pin 68. In this embodiment, the stop pin 68 extends from a side 70 of the at least one table stop 16. The stop pin 68 may also be positioned to extend from an opposing side of the at least one table stop 16 so that the at least one table stop 16 may be positioned on either side of the at least one arm 14 and may be coupled with either a "left-handed" or a "right-handed" version of the at least one arm 14. The at least one arm 14 includes a stop pin receiver 72 that is shaped to receive the stop pin 68. The stop pin receiver 72 is configured to halt the rotation of the at least one arm 14 when a side of the stop pin receiver 72 contacts the stop pin 68.

In some embodiments, the stop pin receiver 72 allows the at least one arm 14 to rotate from a stowed arm angle α' to a released arm angle β'. The stowed arm angle α' may be defined as any appropriate angle formed between the at least one arm 14 and a vertical axis, as illustrated in FIG. 10. In some embodiments, the stowed arm angle α' is approximately 15 degrees when the passenger seat back 26 is in an upright orientation and is approximately 30 degrees when the passenger seat back 26 is in a fully reclined orientation. However, one of skill in the relevant art will understand that the stowed arm angle α' may be any appropriate angle that approximately corresponds to the position of the passenger seat back 26. In some embodiments, the stowed table body angle α and the stowed arm angle α' may have approximately the same value as both angles approximately correspond to the position of the passenger seat back 26. When the at least one arm 14 is positioned at the stowed arm angle α', an outer side 74 of the rotation limiting pin receiver 36 may contact the stop pin 68. In some embodiments, a set screw 78 may be used to adjust the stowed arm angle α'.

The released arm angle β' may be defined as any appropriate angle formed between the at least one arm 14 and the stowed arm angle α', as illustrated in FIG. 10. The released arm angle β' may range from 0 degrees to 60 degrees from the stowed arm angle α', and may preferably be approximately 30 degrees from the stowed arm angle α'. In some embodiments, when the passenger seat back 26 is fully reclined, the released arm angle β' may approximately correspond to the position of the passenger seat back 26, which also corresponds to the stowed arm angle α' of the at least one arm 14. In other words, in some embodiments, when the passenger seat back 26 is fully reclined, the stowed arm angle α' approximately equals the released arm angle β' and no additional rotation of the at least one arm 14 occurs when the tray table assembly 10 is released. When the at least one arm 14 is positioned at the angle β', an inner side 76 of the stop pin receiver 72 may contact the stop pin 68. In some embodiments, another set screw 78 may be used to adjust the released arm angle β'.

In the embodiment illustrated in FIG. 5, a latch 80 may be used to retain the tray table assembly 10 in a stowed position. In this embodiment, the table body 12 includes a lip 82 that is engaged by the latch 80. The type of engagement between the latch 80 and the lip 82 includes but is not limited to the type of latch commonly used for mounted tray tables on an aircraft, a slam latch, a pivot latch, snaps, hook and loop fasteners, snap-fit, or any other suitable releasable fastening device.

When a passenger wishes to deploy the tray table assembly 10, the passenger releases the latch 80 from the lip 82 to deploy the table body 12 and the at least one arm 14 from their stowed angle positions α and α'. The table body 12 rotates to the released table body angle β, where its rotation is halted by contact between the at least one rotation limiting pin 32 and the inner side 40 of the rotation limiting pin receiver 36 (or the set screw 37). Simultaneously, the at least one arm 14 rotates to the released arm angle β', where its rotation is halted by contact between the stop pin 68 and the inner side 76 of the stop pin receiver 72 (or the set screw 78). Once the table body 12 and the at least one arm 14 reach their released angles β and β', the table body 12 is oriented at approximately 90 degrees from the vertical axis.

When the passenger is ready to stow the tray table assembly 10, the passenger rotates the tray table assembly 10 upward until the table body 12 and the at least one arm 14 return to their stowed angles α and α'. The passenger then re-engages the latch 80 with the lip 82 to hold the tray table assembly 10 in its stowed position.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A tray table assembly comprising:
   (a) a table body comprising at least one shaft;
   (b) at least one arm comprising a first end and a second end, wherein the first end is pivotally coupled to the at least one shaft and the second end is configured to pivotally couple to a pivot shaft in a location interior to at least one location where a passenger seat back is pivotally coupled to the pivot shaft; and
   (c) at least one table stop comprising an end, wherein the at least one table stop is configured to couple to the at least one arm, and wherein the end of the at least one table stop is configured to fixedly couple to the pivot shaft in a location adjacent the location where the second end of the at least one arm is configured to pivotally couple to the pivot shaft;
   wherein the table body further comprises at least one rotation limiting pin and the at least one arm further comprises a rotation limiting pin receiver, wherein a side of the rotation limiting pin receiver is configured to contact the at least one rotation limiting pin when the table body is positioned at a released table body angle.

2. The tray table assembly of claim 1, wherein the pivot shaft is coupled to a fixed structure and transfers a turning force from the at least one table stop to the fixed structure.

3. The tray table assembly of claim 1, wherein the tray table assembly is configured to substantially fit within a recess formed in the passenger seat back.

4. The tray table assembly of claim 1, wherein the table body has a thickness that is not greater than approximately one-half inch.

5. The tray table assembly of claim 1, wherein the table body is oriented approximately 90 degrees from a vertical axis when the table body is positioned at the released table body angle and the at least one arm is positioned at a released arm angle.

6. A passenger seat comprising:
   (a) a pivot shaft;
   (b) a passenger seat back comprising a recess, wherein the passenger seat back is pivotally coupled to the pivot shaft in at least one location; and
   (c) a tray table assembly comprising:
      (i) a table body comprising at least one shaft;
      (ii) at least one arm comprising a first end and a second end, wherein the first end is pivotally coupled to the at least one shaft and the second end is pivotally coupled to the pivot shaft in a location interior to the at least one location where the passenger seat back is pivotally coupled to the pivot shaft; and
      (iii) at least one table stop comprising an end, wherein the at least one table stop is configured to couple to the at least one arm, and wherein the end of the at least one table stop is fixedly coupled to the pivot shaft in a location adjacent the location where the second end of the at least one arm is pivotally coupled to the pivot shaft;
   wherein the table body further comprises at least one rotation limiting pin and the at least one arm further comprises a rotation limiting pin receiver, wherein a side of the rotation limiting pin receiver is configured to contact the at least one rotation limiting pin when the table body is positioned at a released table body angle.

7. The tray table assembly of claim 6, wherein the pivot shaft is coupled to a fixed structure and transfers a turning force from the at least one table stop to the fixed structure.

8. The tray table assembly of claim 6, wherein the tray table assembly is configured to substantially fit within the recess of the passenger seat back.

9. The tray table assembly of claim 6, wherein the table body has a thickness that is not greater than approximately one-half inch.

10. The tray table assembly of claim 6, wherein the passenger seat back is configured to pivot relative to the pivot shaft while the tray table assembly remains stationary at the released table body angle and a released arm angle.

11. A method of assembling a tray table assembly comprising the steps of:
   (a) providing a passenger seat comprising a pivot shaft, a passenger seat back comprising a recess, and a latch adjacent the recess, wherein the passenger seat back is pivotally coupled to the pivot shaft in at least one location;
   (b) providing a tray table assembly comprising:
      (i) a table body comprising at least one shaft and a projection;
      (ii) at least one arm comprising a first end and a second end, wherein the first end is pivotally coupled to the at least one shaft; and
      (iii) at least one table stop comprising an end;
   (c) pivotally coupling the second end of the at least one arm to the pivot shaft in a location interior to the at least one location where the passenger seat back is pivotally coupled to the pivot shaft;
   (d) fixedly coupling the end of the at least one table stop to the pivot shaft in a location adjacent the location where the second end of the at least one arm is pivotally coupled to the pivot shaft;
   (e) rotating the table body and the at least one arm upward until the table body and the at least one arm are positioned within the recess in the passenger seat back;
   (f) engaging the latch with the projection on the table body;
   (g) releasing the latch from the projection on the table body;
   (h) rotating the table body downward until the table body reaches a released table body angle; and
   (i) rotating the at least one arm downward until the at least one arm reaches a released arm angle;
   wherein the table body further comprises at least one rotation limiting pin and the at least one arm further comprises a rotation limiting pin receiver, wherein a side of the rotation limiting pin receiver contacts the at least one rotation limiting pin when the table body reaches the released table body angle.

12. The method of claim 11, wherein the table body is oriented approximately 90 degrees from a vertical axis when the table body reaches the released table body angle and the at least one arm reaches the released arm angle.

13. The method of claim 11, wherein the pivot shaft is coupled to a fixed structure and transfers a turning force from the at least one table stop to the fixed structure when the at least one arm reaches the released arm angle.

* * * * *